2,939,136
Patented May 31, 1960

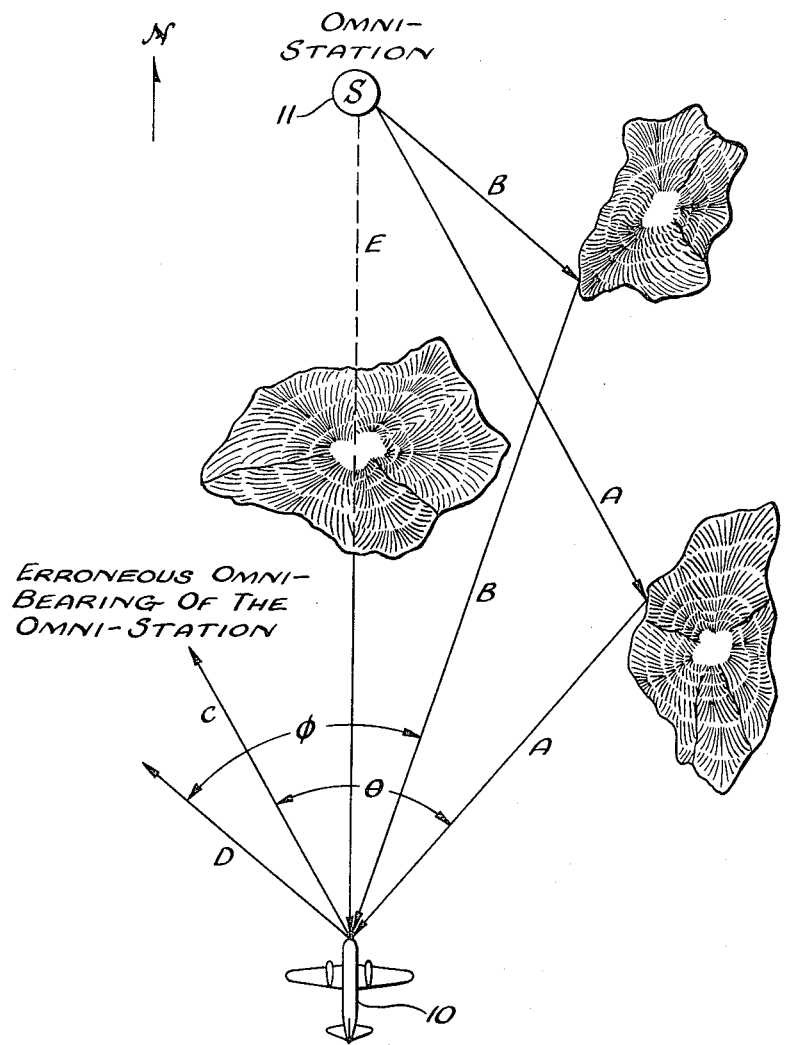

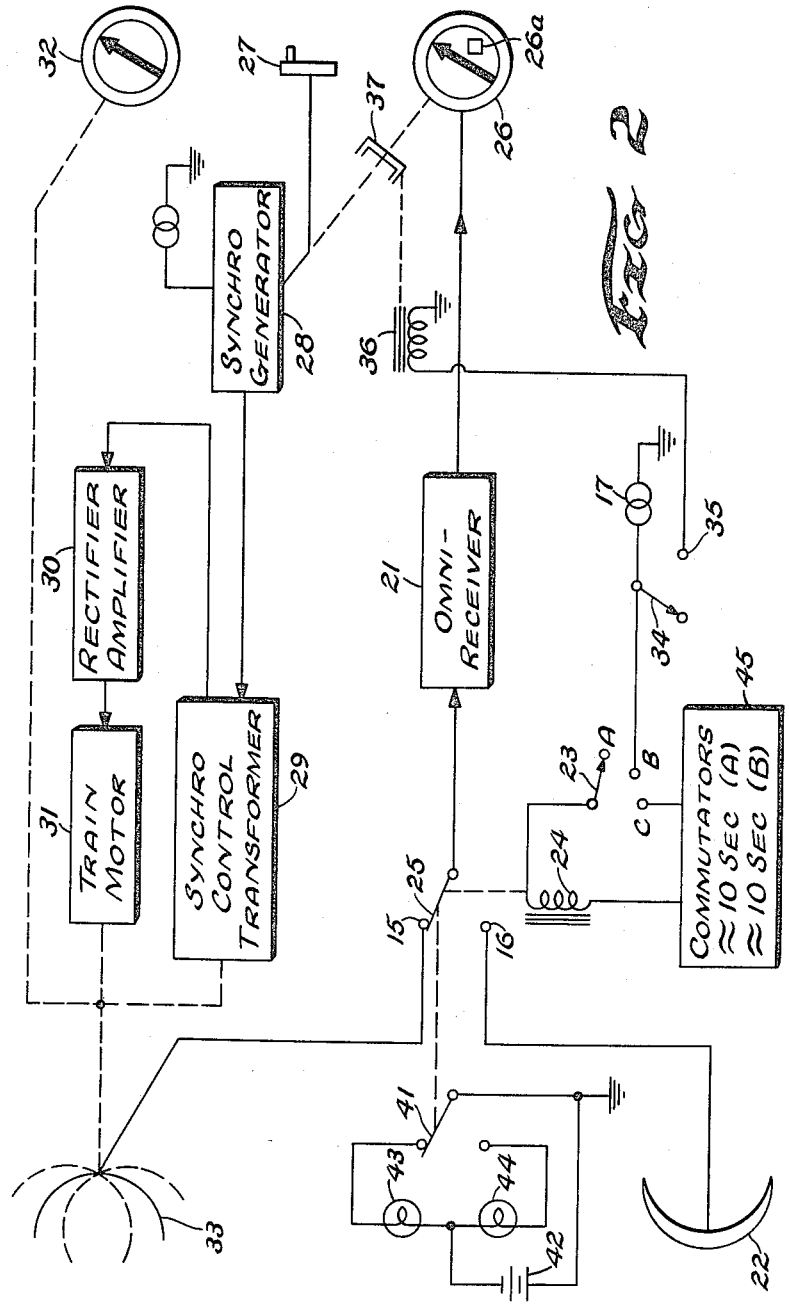

2,939,136

OMNI-DIRECTIONAL RECEIVING SYSTEM WITH DIRECTIONAL ANTENNA

Phineas J. Icenbice, Jr., Northridge, Calif., assignor to Collins Radio Company, Cedar Rapids, Iowa, a corporation of Iowa Filed Dec. 14, 1956, Ser. No. 628,370

2 Claims. (Cl. 343—106)

This invention relates to omni-range navigation systems and more particularly to improvements in such systems for eliminating erroneous bearings from the navigation information.

Omni-range navigation systems contributed a very important advancement in aviation navigation and such systems have assisted the air transportation industry in its successful efforts to become a major transportation facility. Present omni-range navigational systems may produce erroneous bearing indications due to external forces which are not inherent in the navigational instruments but are due to external sources. This invention removes such erroneous bearings from omni-range navigation systems. The erroneous bearings occur when a non-direct omni-range signal is received and evaluated in the omni-range receiver. These non-direct signals, i.e. signals which though radiated in a direct line from the transmitter are not received in a direct line, may result from reflections of the original transmitted signals by geographic or atmospheric elements.

It is an object of this invention to provide for the elimination of erroneous bearings in omni-range navigation systems. It is a further object of this invention to provide for the elimination of such erroneous bearings in an economical manner by utilizing the present omni-range station. It is a still further object of this invention to provide an improved omni-range navigation system free of erroneous bearings, but with the same radiation patterns, and the same receiving and transmitting equipment. It is another object of this invention to provide a navigational system which is operable when the compass aboard an aircraft fails.

These and other objects of this invention will become apparent when the following description is read in conjunction with the drawings in which;

Figure 1 is a representation of direct and reflected omni-range signals received by an aircraft; and Figure 2 is a schematic representation of one embodiment of this invention.

Omni-range systems in aircraft navigation are well-known, and such systems normally include a geographically fixed transmitter and a mobile receiver aboard an aircraft. The geographically fixed transmitter has a predetermined radiation pattern which normally consists of two figures of eight patterns which are in time and phase quadrature. There are normally four antennas associated with each transmitter and the phasing of the signals from the transmitter is so adjusted that the reference phase signal and the variable phase signal are in phase agreement at true north. Thus, the receiver measurement of the phase angle between the reference voltage and the variable voltage is a measure of the bearing of the receiver from the omni-range station. Omni-range receivers are designed to accurately determine the differences in phase angles. In most omni-range navigation equipment there is also a radio direction indicator and a compass reference system which automatically display the bearing of the omni-range station from the receiver.

The present omni-range systems provide very satisfactory bearings and resultant navigation data except when the radio signals received by the omni-directional antenna aboard the aircraft are reflected radio signals.

Three different signal paths, two of which will result in erroneous readings, are shown in Figure 1. When no obstructions to transmission of signals along a direct path exists, the signal is transmitted along path E in a direction due south or 180° from reference north to the aircraft 10. The omni-range receiving equipment will compare the phase of the reference signal with the phase of the variable phase or space-modulated signal for indicating correctly the bearing of the aircraft relative to the station. However, in the example illustrated, assume that high terrain located between station 11 and aircraft 10 attenuates the unreflected signal to such a degree that this signal is substantially weaker than the reflected signal that is received over one of the other two signal paths that are shown. When the received signal is radiated from station 11 along the 150° radial A and reflected from a reflecting surface to aircraft 10, the reference signal and the space-modulated signal as received at the aircraft have the phase relations that correspond to the 150° radial. The pilot, therefore, erroneously interprets the signal as indicating that station 11 is on line C which extends from the aircraft and which is parallel to but displaced a considerable distance from radial A. Likewise, if a signal along a 130° radial B is reflected to aircraft 10, the omni-range receiver in the aircraft will interpret the signal to indicate that the aircraft is on the 130° radial and the pilot will interpret the indication to mean that the omni-range station 11 is on the line D which extends parallel to radial B from the aircraft. These reflected signals may occur because of mountainous terrain as shown in Figure 1 or may be caused by reflections from atmospheric phenomena. In any event, when these reflected radio signals are received and evaluated, erroneous bearing indications are displayed on the radio direction indicator. If the pilot of the aircraft 10 has no method or system for determining the error in the bearings, he will fly along the path indicated by the radio direction indicator as being the correct path. It is obvious that tragic consequences may result from such flights based upon erroneous navigation data.

Figure 2 illustrates one embodiment of this invention which will prevent these erroneous bearing readings. This invention is an addition to present instruments of omni-range navigational equipment. The navigational system will always obtain the correct bearing of the aircraft from the omni-range station when using this invention. The correct bearing is the line of bearing along the direct path E from the airplane to the omni-range station. This particular embodiment of this invention is manually actuated; however, this invention could be made completely automatic if such automation is deemed desirable.

If the aircraft 10 is flying as shown in Figure 1, an omni-range navigational radio signal from the omni-range station 11 may be received along the path B. If the pilot believes that there will be possible reflecting surfaces for radio waves or signals in the vicinity and such reflections could result in an erroneous bearing signal, the pilot should actuate this invention so as to obtain an absolutely correct bearing signal. The omni-receiver 21 is normally connected to the omni-directional antenna 22. As shown in Figure 2, the receiver 21 is connected to antenna 22 when the relay 24 is energized and spring arm 25 is closed against contact 16. The operation of relay 24 is controlled by the positioning of the switch 23. During normal flight of the aircraft, switch 23 is in position B, and in this position connects an alternating current voltage from the generator 17 to the wirings of relay 24 causing the relay to operate. Operation of relay 24 causes the spring arm 25 against contact 16 to result in the omni-receiver 21 being connected to the omni-directional antenna 22. The radio signals received by antenna 22 are thus connected to the receiver 21. The bearing signal generated by the omni-receiver 21 is connected to the radio direction indicator 26 for visual display. The radio direction indicator 26 also includes an alarm signal 26a as an integral part thereof. This alarm signal may be any suitable visual alarm indication such as a light or a flag device as described in U.S. Patent 2,671,208 issued to A. H. Lamb on March 2, 1954. When the alarm signal 26a is actuated, it is an indication that a non-useable signal is being generated by the receiver 21. This alarm signal may be operated by a conventional squelch system which is a part of omni-receiver 21. The alarm is displayed in response to the level of the received signal becoming less than a predetermined level. This signal from the receiver 21 will be unuseable for a number of reasons, but normally is unuseable because of a weakly received radio signal. The relay 24 also operates the spring arm 41 which applies direct current voltage from the battery 42 selectively to lamps 43 and 44. Lamps 43 and 44 are thus visual indications of the position of spring arm 25 and consequently visual indications as to which antenna is connected to the omni-receiver 21.

The bearing indication displayed on the radio direction indictor 26 may be checked for errors by using this invention. The hand crank 27 may be rotated to operate through the transmission system including synchro generator 28, the synchro control transformer 29, and the rectifier and amplifier 30 of the train motor 31 to position the antenna 33. As the antenna 33 is positioned so is the pointer on a second radio direction indicator 32. The pointer on the second radio direction indicator will always indicate the direction of train of the directional antenna 33. To check the navigation bearing displayed by the first radio direction indicator, the pilot rotates the hand crank 27 until the pointer on the second radio direction indicator agrees with the pointer on the first radio direction indicator. The antenna 33 is then pointed in the same position as the first radio direction indicator pointer. This, unless there be some error, is the direction of the omni-station from the aircraft as determined by the radio signals and the omni-receiver. Switch 23 may now be moved to position A. This disconnects the alternating current voltage from the relay 24 thereby releasing spring arm 25. With relay 24 deenergized, spring arm 25 connects the directional antenna 33 to the omni-receiver 21 through contact 15. If the bearing signal displayed by the pointer on the indicator 26 is correct, the directional antenna 33 will sense radio signals from the omni-station 11. If the antenna 33 senses these radio signals, the pointer on the indicator 26 will not change its position, nor will the alarm 26a be actuated because of insufficient signal strength. If, however, the bearing signal does not show the correct direction of the omni-station 11, the directional antenna 33 will not sense any radio signals due to the limited directional characteristics of the antenna. If no signals are sensed and evaluated by the receiver 21, the alarm 26a will be actuated indicating to the pilot that a weak or non-useable signal is present on the omni-receiver 21. The bearing displayed on the indicator 26 is thus indicated to be in error by the action of the alarm 26a.

To obtain the correct bearing indication on indicator 26 the antenna 33 is rotated by hand crank 27 and the transmission system until radio signals are received on the directional antenna. The bearing at which these radio signals are received will be displayed on the indicator 26 and the alarm 26a will cease to operate. The direction of train of the antenna 33 is now indicated on the indicator 32. The bearing indication obtained by the omni-receiver 21 and antenna 33 from the radio signals received by the antenna is displayed by the pointer on indicator 26. When these two pointers are in agreement, the pilot knows that the indicated bearing on the indicator 26 is the correct bearing of the omni-station from the aircraft.

The correct bearing of the omni-station having been determined, the pilot may now turn the switch 23 to position C. If it is desired to continue with only the directional antenna of the omni-receiver in operation, it is obvious that a beam flight may be made directly to the omni-station. With switch 23 in position C, the winding of relay 24 is connected to the commutators 45 which automatically apply voltages in a predetermined cycle to the relay 24. The omni-directional antenna and the directional antenna are thus alternately connected to the omni-receiver 21 by the action of the commutators 45. As long as the two indicators 26 and 32 are in bearing agreement and as long as no alarm is displayed by the alarm box 26a, the aircraft is flying on a correct omni-range bearing. If the two pointers are subsequently in disagreement or if the alarm 26a should once again be actuated, the above procedure must be repeated to obtain the correct and accurate bearing indication.

This invention also includes an automatic feature which is also shown in Figure 2. When switch arm 34 is moved to contact 35, an alternating current voltage is operated from generator 17 to the windings of relay 36. Energization of relay 36 operates the magnetic clutch 37. Clutch 37, when engaged, mechanically couples the train mechanism for the directional antenna 33 and the second radio direction indicator 32 to automatically follow the bearing indications of the indicator 26. The directional antenna 33 will thus automatically track the bearing indication as determined by the omni-receiver 21. This would provide automatic beam flight for the aircraft so that the omni-station would definitely be intercepted.

With the switch arm 23 at position C and the antennas thus being alternately connected to the receiver 21, erroneous bearing indications will be automatically displayed on the indicator 26. If the erroneous bearing indication results from the directional antenna connecting a weak signal to the omni-receiver, the alarm 26a will be actuated. It will also be possible for the pilot to visually determine that the omni-directional antenna is receiving an erroneous signal because the indicator 26 will fluctuate between the correct bearing of the directional antenna and the reflected bearing due to the omni-directional antenna. If the pilot notes either of these conditions, he may once again follow the procedure outlined above to determine the correct bearing of the subject omni-station from the aircraft.

It is obvious that this invention might also be employed with purposely reflected signals in rough terrain. One omni-range station might thus serve a plurality of paths through the mountains by properly arranging reflectors and giving the pilot a predetermined position for a given bearing received on the omni-range directional antenna. Thus, a comparison between the direct bearing as determined by the directional antenna and the bearing determined by the omni-directional antenna could result in an accurate geographic fix.

Although this invention has been described with respect to a particular embodiment thereof, it is not to be so limited as changes and modifications may be made therein which are within the full intended scope of the invention as defined by the appended claims.

I claim:

1. An improved omni-range navigational system including a geographically fixed source of radiant energy, said radiant energy source emitting reference signals and variable signals with a predetermined time and phase relationship between each of said signals, a first means including an omni-directional antenna and a phase sensitive receiver for detecting and measuring the phase difference between said signals, means responsive to said phase differences including a compass system for determining a first true bearing of said radiant energy source from said receiver, a second means including a rotatable directional antenna and said receiver for detecting and measuring the phase difference between said signals, means including said compass system responsive to said phase differences determined by said second means for determining a second true bearing of said radiant energy source from said receiver, means for determining the direction of train of said directional antenna, and means for comparing the bearing from said second bearing determining means and said direction of train of said directional antenna, and means for rotating said directional antenna until signals which are directly radiated from said radio source are being detected and measured so that there is no difference in bearings as indicated by the direction of train of said directional antenna and by said second bearing determing means.

2. An improved omni-range navigational system as defined in claim 1 including commutation means for automatically comparing said first true and said second true bearing after said second bearing and said direction of train of said directional antenna have been made identical, and said compass system indicating a steady true bearing reading in response to reception of signals directly from said source by said first and seconds means.

No references cited.